(12) United States Patent
Ito et al.

(10) Patent No.: US 8,486,357 B1
(45) Date of Patent: Jul. 16, 2013

(54) DESULFURIZATION APPARATUS AND METHOD OF USING CONDENSED WATER PRODUCED THEREIN

(75) Inventors: Motofumi Ito, New York, NY (US); Satoru Sugita, New York, NY (US); Tatsuya Tsujiuchi, New York, NY (US)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/611,396

(22) Filed: Sep. 12, 2012

(51) Int. Cl.
*B01D 53/50* (2006.01)
*B01D 53/62* (2006.01)
*B01D 53/74* (2006.01)
*B01D 53/78* (2006.01)

(52) U.S. Cl.
USPC ........ 423/228; 423/243.01; 422/168

(58) Field of Classification Search
USPC ........ 423/228, 243.01–243.11; 422/168–180
See application file for complete search history.

(56) References Cited

U.S. PATENT DOCUMENTS

| | | | | |
|---|---|---|---|---|
| 6,579,508 B2 * | 6/2003 | Ishida | ........................... | 423/220 |
| 7,585,476 B2 * | 9/2009 | Downs et al. | ................. | 423/210 |

FOREIGN PATENT DOCUMENTS

JP   2008-126154 A   6/2008

\* cited by examiner

*Primary Examiner* — Timothy Vanoy
(74) *Attorney, Agent, or Firm* — Westerman, Hattori, Daniels & Adrian, LLP

(57) ABSTRACT

A method of using condensed water produced in a desulfurization apparatus includes the steps of: bringing a gas to be treated, containing a sulfur dioxide and a desulfurization absorption liquid, into contact with each other to absorb and eliminate the sulfur dioxide from the gas to be treated; cooling a desulfurized gas obtained by the elimination of the sulfur dioxide to produce condensed water from the desulfurized gas; and washing the desulfurization apparatus with the condensed water. In the step of washing the desulfurization apparatus, an inlet for introducing the gas to be treated into the desulfurization apparatus may be washed with the condensed water, and a mist eliminator for eliminating the desulfurization absorption liquid accompanying the desulfurized gas from the gas may be washed with the condensed water.

12 Claims, 2 Drawing Sheets

US 8,486,357 B1

DESULFURIZATION APPARATUS AND METHOD OF USING CONDENSED WATER PRODUCED THEREIN

BACKGROUND OF THE INVENTION

The present invention relates to a desulfurization apparatus and to a method of using condensed water produced in the desulfurization apparatus.

A greenhouse effect due to $CO_2$ has been pointed out as one cause for the global warming phenomenon, and hence research and development has been conducted on technology for preventing or suppressing emission of $CO_2$ into the atmosphere. A main source of the production of $CO_2$ is combustion of fossil fuel. Accordingly, it is desired that an amount of $CO_2$ in a flue gas of the fossil fuel be reduced or $CO_2$ be eliminated from the gas before the gas is discharged into the atmosphere.

Japanese Patent Application Publication No. 2008-126154 describes the following desulfurization decarbonation method. First, a sulfur dioxide in a flue gas of a fossil fuel is absorbed and eliminated by bringing the gas into contact with a desulfurization absorption liquid. After that, $CO_2$ in the desulfurized gas is absorbed and eliminated by bringing the gas into contact with a $CO_2$ absorption liquid made of a basic amine compound or the like. Then, $CO_2$ is separated and recovered from the absorption liquid that has absorbed $CO_2$, and at the same time, the absorption liquid is reclaimed. The literature describes that the desulfurized gas is cooled before being brought into contact with the $CO_2$ absorption liquid. In addition, the literature describes that a part of condensed water to be produced upon cooling of the desulfurized gas is added to the desulfurization absorption liquid.

SUMMARY OF THE INVENTION

Although a part of the condensed water to be produced upon cooling of the desulfurized gas is recycled in a desulfurization apparatus of such construction, a large part thereof is discharged to the outside of the system. Accordingly, there arises a problem in that the amount of drainage is extremely large.

In view of the foregoing, an object of the present invention is to provide a desulfurization apparatus capable of significantly suppressing the amount of drainage to be discharged to the outside of the system by effectively utilizing condensed water to be produced upon cooling of a desulfurized gas, and a method of using the condensed water produced therein.

According to an exemplary embodiment of the present invention, there is provided a method of using condensed water to be produced in a desulfurization apparatus, the method including the steps of: bringing a gas to be treated, containing a sulfur dioxide and a desulfurization absorption liquid, into contact with each other to absorb and eliminate the sulfur dioxide from the gas to be treated; cooling a desulfurized gas obtained by the elimination of the sulfur dioxide to produce condensed water from the desulfurized gas; and washing the desulfurization apparatus with the condensed water.

The step of washing the desulfurization apparatus may include washing an inlet for introducing the gas to be treated into the desulfurization apparatus with the condensed water. The method may further include, before the step of cooling the desulfurized gas, the step of eliminating the desulfurization absorption liquid accompanying the desulfurized gas from the gas with a mist eliminator. In this case, the step of washing the desulfurization apparatus may include washing the mist eliminator with the condensed water. The step of washing the desulfurization apparatus may further include washing both of the gas inlet and the mist eliminator with the condensed water.

The method of the present invention may further include the step of recycling the condensed water as make-up water for the desulfurization absorption liquid. In addition, the method may further include the step of recycling the condensed water as a cooling liquid for cooling the desulfurized gas in the step of cooling the desulfurized gas.

According to another exemplary embodiment of the present invention, there is provided a desulfurization apparatus, including: a desulfurizing part for bringing a gas to be treated, containing a sulfur dioxide and a desulfurization absorption liquid, into contact with each other to absorb and eliminate the sulfur dioxide from the gas to be treated; a supercooling part for cooling a desulfurized gas obtained by the elimination of the sulfur dioxide in the desulfurizing part to produce condensed water from the desulfurized gas; and a condensed water line for supplying the condensed water from the supercooling part to a site to be washed to wash the desulfurization apparatus with the condensed water.

The site to be washed may include a gas inlet for introducing the gas to be treated into the desulfurization apparatus. The apparatus may further include a mist eliminator for eliminating the desulfurization absorption liquid accompanying the desulfurized gas from the gas, the mist eliminator being provided between the desulfurizing part and the supercooling part. In this case, the site to be washed may include the mist eliminator. The site to be washed may include both of the gas inlet and the mist eliminator.

The apparatus of the present invention may further include a make-up water line for supplying the condensed water from the supercooling part to add the condensed water as make-up water to the desulfurization absorption liquid. In addition, the apparatus may further include a line for circulating and supplying the condensed water obtained in the supercooling part to recycle the condensed water as a cooling liquid for cooling the desulfurized gas in the supercooling part.

DESCRIPTION OF PREFERRED EMBODIMENTS

Figure 1:
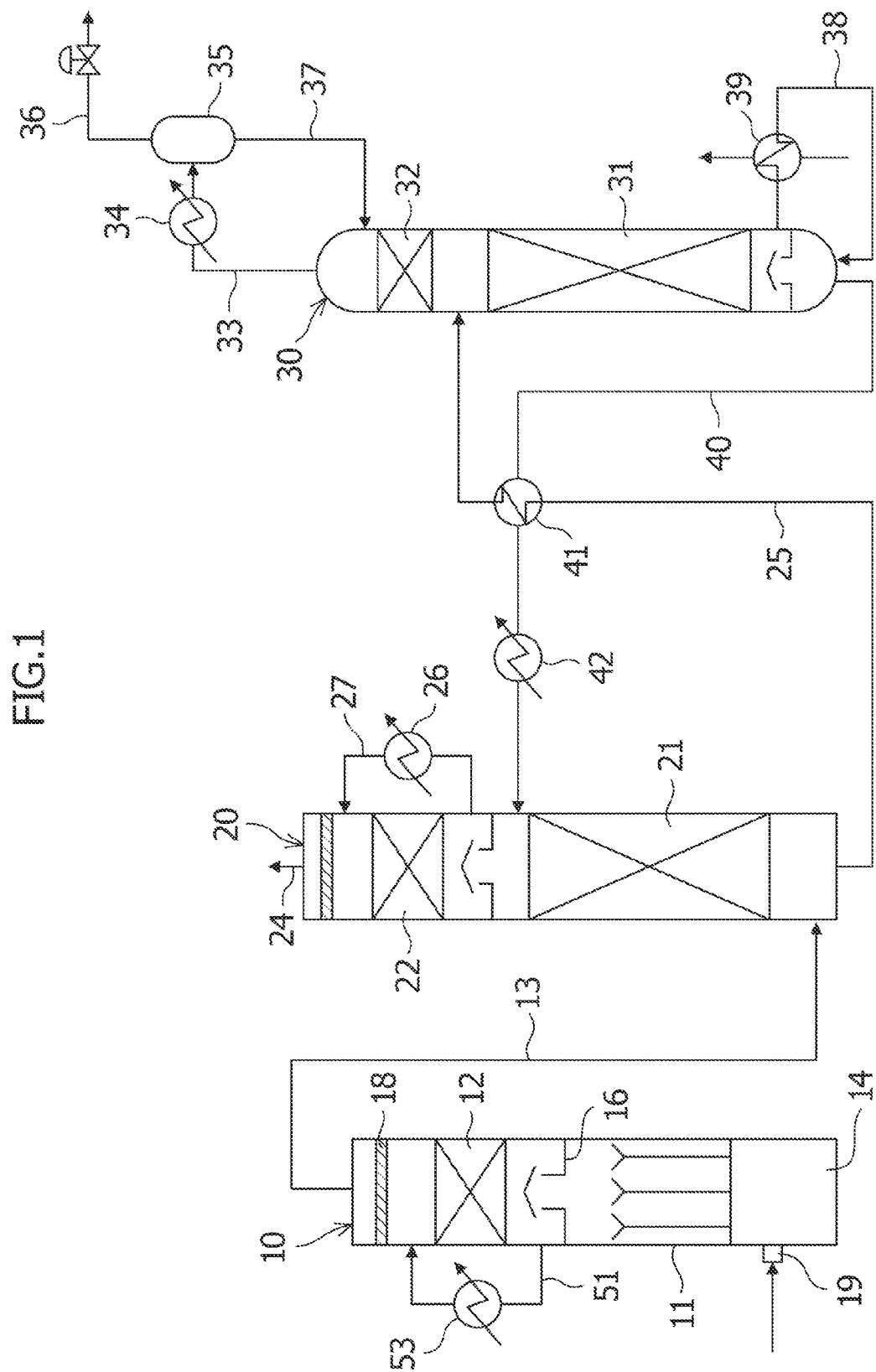
FIG. 1 is a schematic view schematically illustrating an embodiment of a $CO_2$-recovering system including a desulfurization apparatus according to the present invention.

Hereinafter, an embodiment of the present invention is described with reference to the drawings. As illustrated in FIG. 1, a $CO_2$-recovering system according to this embodiment has, as main components, a desulfurization tower 10 for eliminating a sulfur dioxide in a gas to be treated, containing the sulfur dioxide and carbon dioxide such as the flue gas of a fossil fuel, a $CO_2$ absorption tower 20 for eliminating $CO_2$ from a desulfurized gas, which is obtained by the elimination of the sulfur dioxide in the desulfurization tower, with a $CO_2$ absorption liquid, and a reclamation tower 30 for reclaiming a $CO_2$ absorption liquid (referred to as "lean absorption liquid") by desorbing $CO_2$ from the $CO_2$ absorption liquid that has absorbed $CO_2$ (referred to as "rich absorption liquid").

The desulfurization tower 10 has a desulfurizing part 11 for eliminating to a high degree the sulfur dioxide in the gas to be treated in the lower portion of the tower with respect to a chimney tray 16 provided to the central portion of the tower.

The tower has a desulfurized gas-supercooling part 12 for cooling the desulfurized gas that has passed the desulfurizing part in the upper portion of the tower. It should be noted that the desulfurization tower is also referred to as "advanced desulfurization cooling tower." FIG. 2 illustrates an additionally detailed construction of the desulfurization tower 10.

Figure 2:
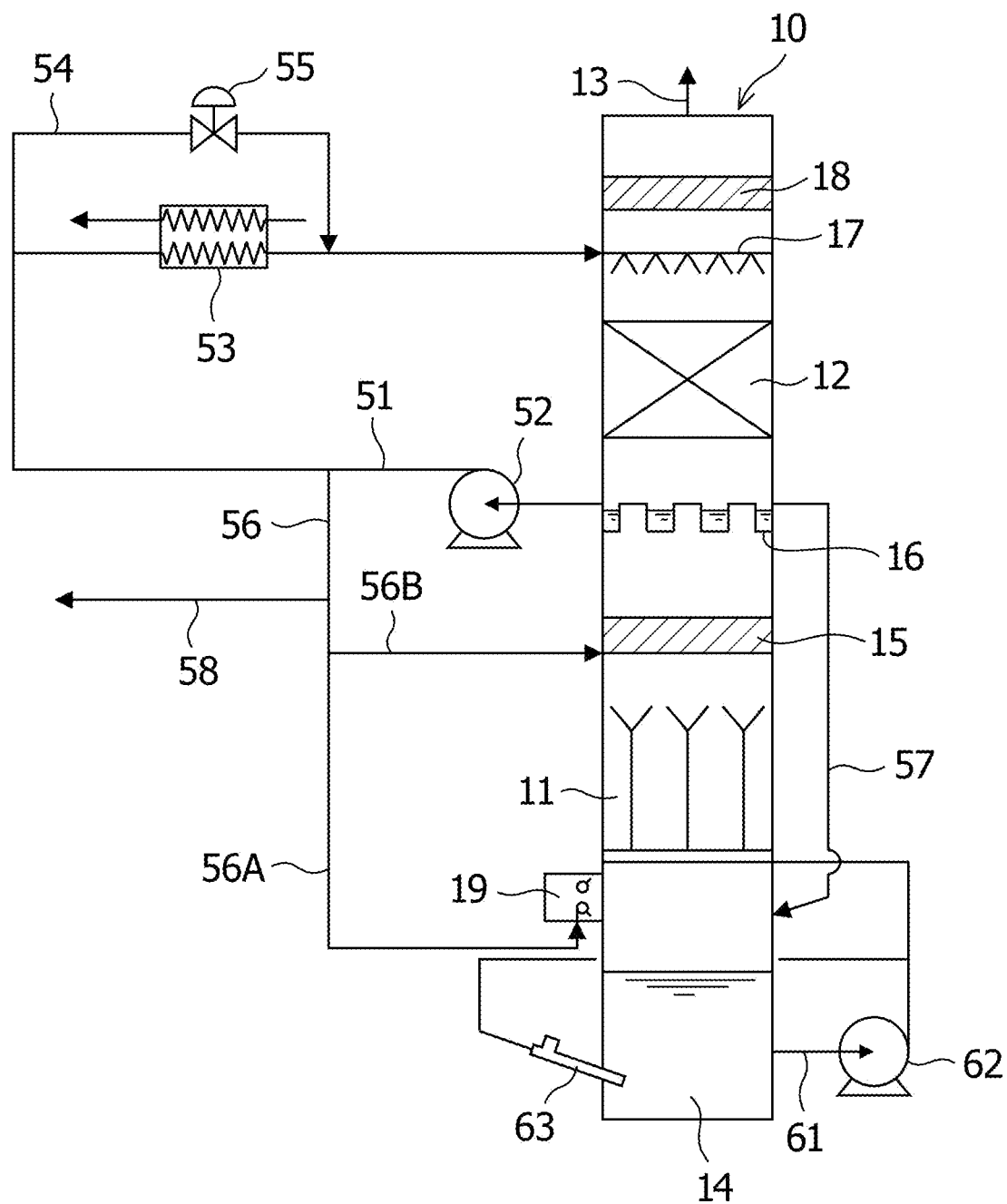
FIG. 2 is a schematic view schematically illustrating the desulfurization apparatus illustrated in FIG. 1.

As illustrated in FIG. 2, the desulfurization tower 10 further has: an absorption liquid tank 14 for storing a desulfurization absorption liquid, the tank being positioned at the bottom portion of the tower; a first mist eliminator 15 for eliminating a droplet accompanying the passing gas, the eliminator being positioned between the desulfurizing part 11 and the chimney tray 16; and a second mist eliminator 18 for eliminating a droplet accompanying the passing gas, the eliminator being positioned closer to a tower apex side with respect to the supercooling part 12. The first mist eliminator 15 has a folded plate structure of a resin or a metal. The second mist eliminator 18 is a structure in which metal wires or resin wires are three-dimensionally weaved in a network fashion.

Further, the desulfurization tower 10 has: a gas inlet 19 provided on the lower side of the desulfurizing part 11 for introducing the gas to be treated into the tower; an absorption liquid-supplying line 61 for supplying the desulfurization absorption liquid in the absorption liquid tank 14 to the desulfurizing part 11; a cooling liquid-circulating line 51 that connects the upper and lower sides of the supercooling part 12 for circulating and supplying a cooling liquid and condensed water that have accumulated in the chimney tray 16 to the supercooling part 12; multiple cooling liquid nozzles 17 for spraying the supercooling part 12 with the cooling liquid to be supplied by the cooling liquid-circulating line; and a gas-discharging line 13 provided to the apex portion of the tower for discharging the desulfurized gas that has passed the desulfurizing part 11 and the supercooling part 12 to the outside of the tower.

The absorption liquid-supplying line 61 is provided with a pump 62 for pumping the desulfurization absorption liquid. In addition, the absorption liquid-supplying line 61 is provided with a blowing nozzle 63 for mixing a part of the desulfurization absorption liquid in the line with air and blowing the mixture into the desulfurization absorption liquid in the absorption liquid tank 14.

The desulfurization absorption liquid to be used in the desulfurizing part 11 preferably contains one compound, or a mixture of two or more compounds, out of, for example, calcium carbonate, calcium hydroxide, magnesium hydroxide, and sodium hydroxide. The concentration of such compound in the desulfurization absorption liquid is preferably, for example, 0.1 to 30 wt %.

The cooling liquid-circulating line 51 is provided with a pump 52 for flowing the cooling liquid and a cooler 53 for cooling the cooling liquid through heat exchange with a coolant. It should be noted that the cooling liquid-circulating line 51 is provided with a bypass line 54 for flowing the cooling liquid from the chimney tray 16 to the cooling liquid nozzles 17 while causing the liquid to bypass the cooler 53, and the bypass line is provided with a valve 55 for regulating the flow rate of the cooling liquid flowing through the bypass line.

Further, the desulfurization tower 10 has a condensed water-recycling line 56 for recycling the cooling liquid that has accumulated in the chimney tray 16 as a washing liquid in the desulfurization tower 10. As illustrated in FIG. 2, the condensed water-recycling line 56 branches, from the cooling liquid-circulating line 51, into a first condensed water-recycling line 56A for supplying the cooling liquid to the gas inlet 19 for the gas to be treated as a site to be washed and a second condensed water-recycling line 56B for supplying the cooling liquid to the first mist eliminator 15 as a site to be washed. In addition, the desulfurization tower 10 has a make-up water line 57 for recycling the cooling liquid that has accumulated in the chimney tray 16 as make-up water in the absorption liquid tank 14 at the bottom portion of the tower. Further, the condensed water-recycling line 56 is provided with a condensed water-discharging line 58 for discharging the condensed water to the outside of the system.

The $CO_2$ absorption tower 20 has a $CO_2$-absorbing part 21 in the lower portion of the tower, and has a water-washing part 22 in the upper portion of the tower. Multiple washing parts may exist. In addition, the $CO_2$ absorption tower 20 has a chimney tray between the $CO_2$-absorbing part 21 and the water-washing part 22, and has a mist eliminator for eliminating a droplet accompanying the passing gas on the tower apex side of each water-washing part 22. Connected to the lower side of the $CO_2$-absorbing part 21 is the gas-discharging line 13 for introducing the desulfurized gas into the tower.

Further, the $CO_2$ absorption tower 20 has: a lean absorption liquid line 40 provided on the upper side of the $CO_2$-absorbing part 21 for supplying the $CO_2$ absorption liquid to the $CO_2$-absorbing part 21; and a rich absorption liquid line 25 provided to the bottom portion of the tower for discharging the rich absorption liquid that has absorbed $CO_2$. Further, the $CO_2$ absorption tower 20 has: a washing water-circulating line 27 that connects the upper and lower sides of each water-washing part 22 for circulating and supplying washing water that has accumulated in each chimney tray to each water-washing part 22; and a gas-discharging line 24 provided to the apex portion of the tower for discharging the gas that has passed the $CO_2$-absorbing part 21 and the water-washing part 22 to the outside of the tower. The washing water-circulating line 27 is provided with a cooler 26 for cooling the washing water to be circulated and supplied.

The $CO_2$ absorption liquid, which is not particularly limited, is preferably a $CO_2$ absorption liquid containing a basic amine compound as a main component. Examples of the basic amine compound include primary amines having alcoholic hydroxyl groups such as monoethanolamine and 2-amino-2-methine-1-propanol, secondary amines having alcoholic hydroxyl groups such as diethanolamine, 2-methylaminoethanol, and 2-ethylaminoethanol, tertiary amines having alcoholic hydroxyl groups such as triethanolamine, N-methyldiethanolamine, 2-dimethylaminoethanol, and 2-diethylaminoethanol, polyethylene polyamines such as ethylenediamine, triethylenediamine, and diethylenetriamine, cyclic amines such as piperazines, piperidines, and pyrrolidines, polyamines such as xylylenediamine, and amino acids such as methylaminocarboxylic acid. The $CO_2$ absorption liquid may contain one or more of those compounds. The concentration of the basic amine compound may be 10 to 70 wt %. The $CO_2$ absorption liquid may contain a carbon dioxide absorption promoter or a corrosion inhibitor. In addition, the liquid may contain methanol, a polyethylene glycol, sulfolane, or the like as any other medium.

The reclamation tower 30 has a $CO_2$-desorbing part 31 ranging from the central portion of the tower to the lower portion thereof, and has a water-washing part 32 above the $CO_2$-desorbing part. The rich absorption liquid line 25 for introducing the rich absorption liquid that has absorbed $CO_2$ in the $CO_2$ absorption tower 20 into the reclamation tower 30 is connected to the reclamation tower 30 between the $CO_2$-desorbing part 31 and the water-washing part 32. In addition, the reclamation tower 30 is provided with the lean absorption liquid line 40 for supplying a lean absorption liquid subjected to a reclamation treatment to the $CO_2$ absorption tower 20 at the bottom portion of the tower. In addition, a heat exchanger 41 for performing heat exchange between the rich absorption liquid line 25 and the lean absorption liquid line 40 is provided. Further, the lean absorption liquid line 40 is provided with a heat exchanger 42 for further recovering the heat of the lean absorption liquid between the heat exchanger 41 and the $CO_2$ absorption tower 20.

The reclamation tower 30 has an absorption liquid-reclaiming line 38 for extracting a part of the absorption liquid from above a chimney tray and supplying the absorption liquid to the bottom portion of the tower, and the absorption liquid-reclaiming line 38 has a reboiler 39 for heating the absorption liquid. In addition, the reclamation tower 30 has a $CO_2$ gas-discharging line 33 for discharging, from the apex portion of the tower, a $CO_2$ gas that has desorbed from the rich absorption liquid, and the $CO_2$ gas-discharging line 33 has a condenser 34 for condensing water vapor accompanying the $CO_2$ gas and a separating drum 35 for separating condensed water produced by the condensation from the gas. The condenser 34 may cool the gas with, for example, cooling water. The separating drum 35 is provided with a condensed water-returning line 37 for supplying the separated condensed water as washing water in the water-washing part 32 of the reclamation tower 30.

The separating drum 35 is provided with a $CO_2$ gas line 36 for supplying the separated $CO_2$ gas to a $CO_2$ gas-compressing system (not shown), and the $CO_2$ gas line 36 is provided with a valve for adjusting the flow rate of the $CO_2$ gas. Although not shown, the $CO_2$ gas-compressing system is an apparatus for compressing the $CO_2$ gas to a predetermined pressure with multiple compressors.

With such construction, first, the gas to be treated, containing the sulfur dioxide and carbon dioxide, is introduced into the desulfurization tower 10 through the gas inlet 19. The desulfurizing part 11 in the tower can perform such an advanced desulfurization treatment that the concentration of the sulfur dioxide in the gas is set to 5 ppm or less, preferably 1 ppm or less by bringing the gas into gas-liquid contact with the desulfurization absorption liquid to absorb and eliminate the sulfur dioxide. The concentration of the sulfur dioxide in the gas should be 5 ppm or less because the following problem arises when the concentration exceeds 5 ppm. The sulfur dioxide accumulates in the $CO_2$ absorption liquid to be used in the $CO_2$ absorption tower 20, which increases the frequency at which the $CO_2$ absorption liquid is reclaimed.

It should be noted that the desulfurization absorption liquid in the absorption liquid tank 14 is supplied to the desulfurizing part 11 through the absorption liquid-supplying line 61, and is then sprayed on the gas to be treated. In addition, air is blown into the desulfurization absorption liquid in the absorption liquid tank 14 through the blowing nozzle 63 to cause the sulfur dioxide absorbed by the desulfurization absorption liquid to react with the desulfurization absorption liquid, and further, to oxidize the resultant, thereby producing a by-product such as plaster.

When the desulfurized gas passes the first mist eliminator 15, droplets (mainly the desulfurization absorption liquid) accompanying the gas are eliminated. After that, the gas passes the chimney tray 16 to flow into the supercooling part 12 in the upper portion of the tower. In the supercooling part 12, the cooling liquid is sprayed from the multiple cooling liquid nozzles 17 to cool the desulfurized gas so that its temperature may fall within the range of 50° C. or less, preferably 45° C. or less, more preferably 30 to 45° C. The gas temperature should be 50° C. or less because the following problem arises when the temperature exceeds 50° C. In the subsequent $CO_2$ absorption tower 20, the amount of the basic amine compound as a main component for the $CO_2$ absorption liquid accompanying the gas increases, and hence the basic amine compound is wastefully consumed.

After droplets (mainly the cooling liquid) accompanying the desulfurized gas thus cooled have been eliminated by the second mist eliminator 18, the gas is fed from the gas-discharging line 13 at the apex portion of the tower into the $CO_2$ absorption tower 20. $CO_2$ in the gas to be treated can be eliminated and recovered in the $CO_2$ absorption tower 20 with ease and at a low cost by installing the advanced desulfurization cooling apparatus on the upstream side of the gas of the $CO_2$ absorption tower 20 as described above.

Meanwhile, in the supercooling part 12, moisture in the desulfurized gas condenses by the cooling. As a result, the condensed water accumulates in the chimney tray 16 together with the sprayed cooling liquid. The cooling liquid and the condensed water are cooled in the cooler 53 through the cooling liquid-circulating line 51 so as to be recycled in the supercooling part 12. After that, the resultant is sprayed as a cooling liquid from the cooling liquid nozzles 17. It should be noted that a ratio between the flow rate of the cooling liquid flowing through the bypass line 54 and the flow rate of the cooling liquid flowing through the cooler 53 can be regulated and controlled through the valve 55 for cooling the desulfurized gas to a predetermined temperature in the supercooling part 12.

In the chimney tray 16, a large amount of the condensed water is recovered from the desulfurized gas in addition to a certain amount of the cooling liquid to be recycled as described above. Accordingly, the condensed water can be recycled as a washing liquid in the desulfurization tower 10 through the condensed water-recycling line 56, or can be recycled as make-up water in the absorption liquid tank 14 at the bottom portion of the tower through the make-up water line 57.

With regard to the manner in which the condensed water is recycled, first, the condensed water can be used as washing water for the gas inlet 19 by being supplied to the gas inlet 19 through the first condensed water-recycling line 56A. As the gas to be treated, containing the sulfur dioxide passes the gas inlet 19, plaster or the like to be produced by the reaction adheres to its duct portion or the like. Accordingly, the condensed water recovered in the chimney tray 16 is recycled for washing such attachment. The washing of the gas inlet 19 may be continuously performed during the operation of the desulfurization tower 10, or may be intermittently performed.

With regard to the manner in which the condensed water is recycled, next, the condensed water can be used as washing water for the first mist eliminator 15 by being supplied to the first mist eliminator 15 through the second condensed water-recycling line 56B. As the desulfurized gas accompanied with the desulfurization absorption liquid passes the first mist eliminator 15, plaster or the like adheres to its folded plate structure portion. Accordingly, the condensed water recovered in the chimney tray 16 is recycled for washing such attachment. The washing of the first mist eliminator 15 may be continuously performed during the operation of the desulfurization tower 10, or may be intermittently performed.

With regard to the manner in which the condensed water is recycled, further, the condensed water can be used as make-up water to be added to the desulfurization absorption liquid of the desulfurizing part 11 by being supplied to the absorption liquid tank 14 at the bottom of the tower through the make-up water line 57. In the desulfurizing part 11, the desulfurization absorption liquid sprayed on the gas to be treated falls into the absorption liquid tank 14 at the bottom of the tower. Accordingly, the desulfurization absorption liquid circulates in the desulfurizing part 11 to be recycled. However, a part of the liquid evaporates owing to contact with the gas to be treated having a high temperature, and then the vapor is discharged from the desulfurizing part 11 together with the desulfurized gas. Accordingly, make-up water needs to be added to the desulfurization absorption liquid in the absorption liquid tank 14. The addition of the make-up water may be continuously performed during the operation of the desulfurization tower 10, or may be intermittently performed.

Excessive condensed water is discharged to the outside of the system through the condensed water-discharging line 58. The condensed water thus discharged can be separately recycled, or can be disposed of after necessary treatment.

Next, the desulfurized gas introduced from the desulfurization tower 10 into the $CO_2$ absorption tower 20 through the gas-discharging line 13 is brought into gas-liquid contact with the $CO_2$ absorption liquid in the $CO_2$-absorbing part 21. Thus, $CO_2$ in the desulfurized gas is absorbed and eliminated by the $CO_2$ absorption liquid. The gas from which $CO_2$ has been eliminated passes the chimney tray to flow into the water-washing part 22 where the gas is washed with washing water. After that, the decarbonated gas washed in the washing part 22 passes the mist eliminator to be discharged from the gas-discharging line 24 at the apex portion of the tower. The washing water used in the water-washing part 22 accumulates in chimney tray but does not flow down into the $CO_2$-absorbing part 21. The washing water that has accumulated is recycled as washing water in the water-washing part 22 through the washing water-circulating line 27.

The rich absorption liquid that has absorbed $CO_2$ in the $CO_2$ absorption tower 20 is discharged from the bottom of the tower through the rich absorption liquid line 25, heated in the heat exchanger 41, and then fed into the reclamation tower 30. In the reclamation tower 30, the rich absorption liquid is spread over the $CO_2$-desorbing part 31. The rich absorption liquid flows down in the $CO_2$-desorbing part 31 while being heated. Then, the liquid emits a large part of its $CO_2$ before flowing down to the chimney tray near the bottom of the tower. The absorption liquid that has accumulated in the chimney tray is heated with steam in the reboiler 39 through the absorption liquid-reclaiming line 38 to emit the remaining $CO_2$. Thus, the absorption liquid is reclaimed, which is returned to the bottom of the reclamation tower 30. The reclaimed lean absorption liquid heats the rich absorption liquid in the heat exchanger 41 through the lean absorption liquid line 40 at the bottom of the tower. Further, heat is recovered from the liquid in the heat exchanger 42, and then the liquid is supplied to the $CO_2$ absorption tower 20.

The $CO_2$ gas that has desorbed from the rich absorption liquid passes the chimney tray and the $CO_2$-desorbing part 31 to move upward toward the water-washing part 32. In the water-washing part 32, the washing water is spread from the condensed water-returning line 37 to eliminate the $CO_2$ absorption liquid accompanying the $CO_2$ gas. The $CO_2$ gas washed in the water-washing part 32 is discharged from the $CO_2$ gas-discharging line 33 at the apex of the reclamation tower. Water vapor accompanying the $CO_2$ gas discharged from the reclamation tower 30 is condensed in the condenser 34. Further, the condensed water is separated in the separating drum 35. The $CO_2$ gas from which the condensed water has been eliminated is supplied to the $CO_2$ gas-compressing system (not shown) through the $CO_2$ gas line 36, compressed to a predetermined pressure, and recovered.

It should be noted that the present invention is not limited to the embodiment illustrated in FIG. 1, and for example, a desulfurization tower free of any supercooling part and having only a desulfurizing part may be installed on the upstream side of the desulfurization tower 10 as the advanced desulfurization cooling tower.

Example

The amount of condensed water to be produced in the advanced desulfurization cooling tower illustrated in FIG. 2 and the amount of the condensed water to be recycled were calculated. In the case of a desulfurization tower having an output of 150 MW, the amount of condensed water to be produced was 788 tons/day. Meanwhile, the amount of washing water for the duct of the gas inlet was 51 tons/day, the amount of washing water for the mist eliminator was 177 tons/day, and the amount of make-up water for the absorption liquid was 216 tons/day. Accordingly, the amount of the condensed water to be discharged was 344 tons/day, and hence a significant reduction in amount of drainage was attained.

The amount of condensed water to be produced and the amount of the condensed water to be recycled were also calculated in the case in which a desulfurization tower free of any supercooling part and having only a desulfurizing part was installed on the upstream side of the advanced desulfurization cooling tower illustrated in FIG. 2. In the case of an advanced desulfurization cooling tower having an output of 150 MW, under the condition of its inlet gas temperature of 80° C., the amount of condensed water to be produced was 599 tons/day. Meanwhile, the amount of washing water for the duct of the gas inlet was 19 tons/day, the amount of washing water for the mist eliminator was 177 tons/day, and the amount of make-up water for the absorption liquid was 81 tons/day. Accordingly, the amount of the condensed water to be discharged was 323 tons/day, and hence a significant reduction in amount of drainage was attained.

The present invention has been described above with a preferred embodiment. However, the foregoing description is not intended to limit the scope of the present invention to a specific embodiment described above. On the contrary, the description is intended to show that various modifications, alterations, and equivalents can be made without deviating from the spirit and scope of the present invention specified by the attached scope of claims.

What is claimed is:

1. A method of using condensed water to be produced in a desulfurization apparatus, the method comprising the steps of:
   bringing a gas to be treated, containing a sulfur dioxide and a desulfurization absorption liquid, into contact with each other to absorb and eliminate the sulfur dioxide from the gas to be treated;
   cooling a desulfurized gas obtained by the elimination of the sulfur dioxide to produce condensed water from the desulfurized gas; and
   washing the desulfurization apparatus with the condensed water.

2. The method according to claim 1, wherein the step of washing the desulfurization apparatus includes washing an inlet for introducing the gas to be treated into the desulfurization apparatus with the condensed water.

3. The method according to claim 1, further comprising, before the step of cooling the desulfurized gas, the step of eliminating the desulfurization absorption liquid accompanying the desulfurized gas from the gas with a mist eliminator, wherein the step of washing the desulfurization apparatus includes washing the mist eliminator with the condensed water.

4. The method according to claim 3, wherein the step of washing the desulfurization apparatus further includes washing an inlet for introducing the gas to be treated into the desulfurization apparatus with the condensed water.

5. The method according to claim 1, further comprising the step of recycling the condensed water as make-up water for the desulfurization absorption liquid.

6. The method according to claim 1, further comprising the step of recycling the condensed water as a cooling liquid for cooling the desulfurized gas in the step of cooling the desulfurized gas.

7. A desulfurization apparatus comprising:
a desulfurizing part for bringing a gas to be treated, containing a sulfur dioxide and a desulfurization absorption liquid, into contact with each other to absorb and eliminate the sulfur dioxide from the gas to be treated;
a supercooling part for cooling a desulfurized gas obtained by the elimination of the sulfur dioxide in the desulfurizing part to produce condensed water from the desulfurized gas; and
a condensed water line for supplying the condensed water from the supercooling part to a site to be washed to wash the desulfurization apparatus with the condensed water.

8. The apparatus according to claim 7, wherein the site to be washed comprises a gas inlet for introducing the gas to be treated into the desulfurization apparatus.

9. The apparatus according to claim 7, further comprising a mist eliminator for eliminating the desulfurization absorption liquid accompanying the desulfurized gas from the gas, the mist eliminator being provided between the desulfurizing part and the supercooling part, wherein the site to be washed comprises the mist eliminator.

10. The apparatus according to claim 9, wherein the site to be washed further comprises a gas inlet for introducing the gas to be treated into the desulfurization apparatus.

11. The apparatus according to claim 7, further comprising a make-up water line for supplying the condensed water from the supercooling part to add the condensed water as make-up water to the desulfurization absorption liquid.

12. The apparatus according to claim 7, further comprising a line for circulating and supplying the condensed water obtained in the supercooling part to recycle the condensed water as a cooling liquid for cooling the desulfurized gas in the supercooling part.

\* \* \* \* \*